United States Patent
Messerman et al.

(10) Patent No.: US 9,887,837 B2
(45) Date of Patent: Feb. 6, 2018

(54) SYSTEM AND METHOD FOR SYNCHRONIZED KEY DERIVATION ACROSS MULTIPLE CONDITIONAL ACCESS SERVERS

(71) Applicant: Verimatrix, Inc., San Diego, CA (US)

(72) Inventors: Matthew Messerman, San Deigo, CA (US); Thomas Handal, Redmond, WA (US); Matthew Fite, San Diego, CA (US); Gerd Mersmann, München (DE)

(73) Assignee: Verimatrix, Inc., San Diego, CA (US)

( * ) Notice: Subject to any disclaimer, the term of this patent is extended or adjusted under 35 U.S.C. 154(b) by 41 days.

(21) Appl. No.: 15/032,039

(22) PCT Filed: Oct. 31, 2014

(86) PCT No.: PCT/US2014/063585
§ 371 (c)(1),
(2) Date: Apr. 25, 2016

(87) PCT Pub. No.: WO2015/066556
PCT Pub. Date: May 7, 2015

(65) Prior Publication Data
US 2016/0254907 A1    Sep. 1, 2016

Related U.S. Application Data

(60) Provisional application No. 61/898,441, filed on Oct. 31, 2013.

(51) Int. Cl.
*H04L 29/06* (2006.01)
*H04L 9/08* (2006.01)
(Continued)

(52) U.S. Cl.
CPC ............. *H04L 9/083* (2013.01); *H04L 9/088* (2013.01); *H04L 9/0833* (2013.01);
(Continued)

(58) Field of Classification Search
CPC ........................... H04L 9/0836; H04L 9/0861
See application file for complete search history.

(56) References Cited

U.S. PATENT DOCUMENTS

| | | | |
|---|---|---|---|
| 7,039,614 B1 * | 5/2006 | Candelore | G06F 21/6218 348/E7.056 |
| 7,200,717 B2 * | 4/2007 | Guthrie | G06F 9/3004 711/125 |

(Continued)

FOREIGN PATENT DOCUMENTS

| | | |
|---|---|---|
| EP | 2487828 A1 | 8/2012 |
| WO | 2015066556 A1 | 5/2015 |

OTHER PUBLICATIONS

Extended European Search Report for European Application No. 14858223.2, Search Completed May 22, 2017, dated Jun. 1, 2017, 8 pgs.

(Continued)

*Primary Examiner* — Ali Shayanfar
(74) *Attorney, Agent, or Firm* — KPPB LLP

(57) ABSTRACT

Systems and methods for synchronized key derivation across multiple conditional access servers are disclosed. In one embodiment, a method for synchronized key derivation to provide playback devices with derived keys for decrypting content includes receiving a request for a first derived key that includes a first asset identifier than identifies a piece of content and a first playback position within the content, determining a first content key starting position and first derived key starting position within the content using the first playback position, where the key starting positions precede the first playback position, determining whether a first content key associated with the first asset identifier and first content key starting position is stored, retrieving the first content key using the first asset identifier and first content (Continued)

key starting position, generating a first derived key using the first content key and first derived key starting position, and sending the derived key.

22 Claims, 11 Drawing Sheets

(51) Int. Cl.
    *H04L 9/16*     (2006.01)
    *H04N 7/167*     (2011.01)

(52) U.S. Cl.
    CPC .......... *H04L 9/0836* (2013.01); *H04L 9/0861* (2013.01); *H04L 9/16* (2013.01); *H04N 7/1675* (2013.01); *H04L 2209/60* (2013.01)

(56) References Cited

U.S. PATENT DOCUMENTS

| | | | |
|---|---|---|---|
| 7,392,382 | B1 | 6/2008 | Weis et al. |
| 7,401,232 | B2 * | 7/2008 | Ono ................. H04N 5/913 348/E5.004 |
| 8,516,529 | B2 * | 8/2013 | Lajoie ............. H04L 65/1016 709/201 |
| 8,824,685 | B2 * | 9/2014 | Candelore .......... H04L 9/0833 380/277 |
| 2004/0039916 | A1 | 2/2004 | Aldis et al. |
| 2004/0268117 | A1 | 12/2004 | Olivier et al. |
| 2005/0201556 | A1 | 9/2005 | Rijckaert et al. |
| 2005/0249350 | A1 | 11/2005 | Kahn et al. |
| 2006/0031676 | A1 * | 2/2006 | Vantalon ............ G06Q 10/02 713/176 |
| 2006/0034453 | A1 | 2/2006 | Liu |
| 2009/0052661 | A1 | 2/2009 | Fahrny et al. |
| 2010/0254536 | A1 * | 10/2010 | Dellow .................. H04L 9/32 380/278 |
| 2011/0231660 | A1 | 9/2011 | Kanungo |
| 2011/0231870 | A1 * | 9/2011 | Hartung ............ H04N 21/4345 725/25 |
| 2013/0121489 | A1 * | 5/2013 | Pestoni ............... H04L 9/0822 380/210 |
| 2014/0281489 | A1 * | 9/2014 | Peterka ............. H04L 63/0464 713/153 |
| 2015/0066556 | A1 * | 3/2015 | Dominick ............ G06Q 50/18 705/7.15 |
| 2015/0178478 | A1 * | 6/2015 | Kocher ................ G06F 21/10 726/26 |
| 2016/0300064 | A1 * | 10/2016 | Stewart ............... G06F 21/575 |

OTHER PUBLICATIONS

International Preliminary Report on Patentability for International Application PCT/US2014/063585, Report issued May 3, 2016, dated May 12, 2016, 11 Pgs.
International Search Report and Written Opinion for International Application PCT/US2014/063585, Search completed Jan. 12, 2015, dated Jan. 26, 2015, 11 Pgs.

* cited by examiner

SYSTEM AND METHOD FOR SYNCHRONIZED KEY DERIVATION ACROSS MULTIPLE CONDITIONAL ACCESS SERVERS

FIELD OF THE INVENTION

The present invention relates generally to Conditional Access (CA) systems and more specifically to CA systems in Internet Protocol Television (IPTV) systems.

BACKGROUND

An Internet Protocol television (IPTV) system is a system through which television services can be delivered using the Internet protocol suite over a packet-switched network such as the Internet. IPTV systems can incorporation Conditional Access (CA) systems that enable the protection of content by requiring certain criteria to be met before granting access to content distributed via the IPTV system. CA systems can protect content using secret keys to scramble and/or encrypt the content.

An additional service that can be provided by IPTV operators is the delivery of Over-the-Top (OTT) content. The term OTT content can be used to refer to a variety of content sources in different contexts. OTT content can be delivered over a third party network and/or over an unmanaged network such as a cellular network. OTT content can also refer to delivery of content using adaptive bitrate streaming and/or via Hypertext Transfer Protocol (HTTP). CA systems in IPTV systems can generate keys to enable the secure distribution of OTT content. These keys are transmitted to a security client on a playback device attempting to playback an encrypted stream.

In the case of streaming video, OTT keys can be generated by a CA system when requested by an encoder that is encoding source content into one or more video streams. In the case of video on demand (VOD) services, the encoder (or an Encryptor or a Packager) communicates the number of required keys to the CA system. VOD content typically has a finite duration. Therefore, the number of keys utilized to encrypt and secure the content can be determined at the time of the key request. When the content is part of a digital television (DTV) broadcast stream or a live stream, the number of keys required to encrypt the content is typically unknown at the time of the request. When the encoder requests a VOD key, the position (or key number) can be passed to the CA system so that CA system can use this information to determine which key to hand back to the encoder. In the case of DTV or live streaming of content, the position can be denoted by a counter (or a timestamp) which is always incrementing with each key. Since there is no limit, the counter can keep going and keys will keep being generated.

SUMMARY OF THE INVENTION

Systems and methods for synchronized key derivation across multiple conditional access servers are disclosed. In one embodiment, a method for synchronized key derivation and distribution across multiple conditional access servers to provide playback devices with derived keys for decrypting content includes receiving by a conditional access server a request for a first derived key, where the request includes a first asset identifier that identifies a piece of content and a first playback position within the piece of content associated with the first asset identifier, determining using the conditional access server a first content key starting position and a first derived key starting position within the piece of content using the first playback position, where the first content key starting position and first derived key starting position precede the first playback position, determining using the conditional access server whether a first content key associated with the first asset identifier and first content key starting position is stored in memory, retrieving by the conditional access server the first content key from memory using the first asset identifier and the first content key starting position when the first content key is stored in memory, generating by the conditional access server a first derived key using at least the first content key and the first derived key starting position, and sending by the conditional access server the first derived key in response to the request for a first derived key.

A further embodiment also includes generating by the conditional access server the first content key, storing the first content key in memory, and associating the first content key with the first asset identifier and the first content key starting position when the first content key is not stored in memory.

Another embodiment also includes sending by the conditional access server a request for a first content key where the request includes the first asset identifier and first content key starting position, receiving the first content key, storing the first content key in memory, and associating the first content key with the first asset identifier and the first content key starting position when the first content key is not stored in memory.

A still further embodiment also includes receiving by the conditional access server a request for a second derived key, where the request includes the first asset identifier and a second playback position within the piece of content associated with the first asset identifier, determining using the conditional access server a second derived key starting position within the piece of content using the second playback position, where the second derived key starting position precedes the second playback position, is a predetermined derived key interval after the first derived key starting position, and is within a predetermined content key interval of the first content key starting position, generating by the conditional access server a second derived key using at least the first content key and the second derived key starting position, and sending by the conditional access server the second derived key in response to the request for a second derived key.

Still another embodiment also includes receiving by the conditional access server a request for a third derived key, where the request includes the first asset identifier and a third playback position within the piece of content associated with the first asset identifier, determining using the conditional access server a second content key starting position within the piece of content using the third playback position, where the second content key starting position precedes the third playback position and is a predetermined content key interval after the first content key starting position, determining using the conditional access server a third derived key starting position within the piece of content using the third playback position, where the third derived key starting position precedes the third playback position, is a predetermined derived key interval after the second derived key starting position, and is within a predetermined content key interval of the second content key starting position, determining using the conditional access server whether a second content key associated with the first asset identifier and second content key starting position is stored in memory, retrieving by the conditional access server the second content key from memory using the first asset identifier and the second content key starting position when the second content key is stored in memory, generating by the conditional access server a third derived key using at least the second content key and the third derived key starting position, and sending by the conditional access server the third derived key in response to the request for a third derived key.

A yet further embodiment also includes sending by the conditional access server a request for a second content key where the request includes the first asset identifier and second content key starting position, receiving the second content key, storing the second content key in memory, and associating the second content key with the first asset identifier and the second content key starting position when the second content key is not stored in memory.

In yet another embodiment, the first content key starting position designates the starting location of a portion of the content that is encrypted using at least one derived key generated using the first content key and the first derived key starting position designates the starting location of a portion of the content that is encrypted using the first derived key.

In a further embodiment again, generating by the conditional access server a first derived key using at least the first content key and the first playback position includes generating a first derived key using at least the first content key, the first playback position, and a license key issued to a plurality of conditional access servers.

In another embodiment again, the request for a first derived key also includes the type of the content, and generating by the conditional access server a first derived key using at least the first content key and the first playback position also includes generating a first derived key using at least the first content key, the first playback position, and the type of the content.

In a further additional embodiment, generating by the conditional access server a first derived key using at least the first content key and the first playback position also includes generating a first derived key using at least the first content key, the first playback position, and the derived key expiration time.

In another additional embodiment, generating by the conditional access server a first derived key using at least the first content key and the first playback position also includes generating a first derived key using at least the first content key, the first playback position, and the asset identifier.

A still yet further embodiment also includes receiving by the conditional access server a derivation algorithm identifier that identifies the algorithm to be used in generating the first derived key.

In still yet another embodiment, a conditional access server system for synchronized key derivation and distribution to provide playback devices with derived keys for decrypting content includes a processor and a memory storing a key derivation application, where the key derivation application directs the processor to receive a request for a first derived key, where the request includes a first asset identifier that identifies a piece of content and a first playback position within the piece of content associated with the first asset identifier, determine a first content key starting position and a first derived key starting position within the piece of content using the first playback position, where the first content key starting position and first derived key starting position precede the first playback position, determine whether a first content key associated with the first asset identifier and first content key starting position is stored in memory, retrieve the first content key from memory using the first asset identifier and the first content key starting position when the first content key is stored in memory, generate a first derived key using at least the first content key and the first derived key starting position, and send the first derived key in response to the request for a first derived key.

In a still further embodiment again, the key derivation application also directs the processor to generate the first content key, store the first content key in memory, and associate the first content key with the first asset identifier and the first content key starting position when the first content key is not stored in memory.

In still another embodiment again, the key derivation application also directs the processor to send a request for a first content key where the request includes the first asset identifier and first content key starting position, receive the first content key, store the first content key in memory, and associate the first content key with the first asset identifier and the first content key starting position when the first content key is not stored in memory.

In a still further additional embodiment, the key derivation application also directs the processor to receive a request for a second derived key, where the request includes the first asset identifier and a second playback position within the piece of content associated with the first asset identifier, determine a second derived key starting position within the piece of content using the second playback position, where the second derived key starting position precedes the second playback position, is a predetermined derived key interval after the first derived key starting position, and is within a predetermined content key interval of the first content key starting position, generate a second derived key using at least the first content key and the second derived key starting position, and send the second derived key in response to the request for a second derived key.

In still another additional embodiment, the key derivation application also directs the processor to receive a request for a third derived key, where the request includes the first asset identifier and a third playback position within the piece of content associated with the first asset identifier, determine a second content key starting position within the piece of content using the third playback position, where the second content key starting position precedes the third playback position and is a predetermined content key interval after the first content key starting position, determine a third derived key starting position within the piece of content using the third playback position, where the third derived key starting position precedes the third playback position, is a predetermined derived key interval after the second derived key starting position, and is within a predetermined content key interval of the second content key starting position, determine whether a second content key associated with the first asset identifier and second content key starting position is stored in memory, retrieve the second content key from memory using the first asset identifier and the second content key starting position when the second content key is stored in memory, generate a third derived key using at least the second content key and the third derived key starting position, and send the third derived key in response to the request for a third derived key.

In a yet further embodiment again, the key derivation application also directs the processor to send a request for a second content key where the request includes the first asset identifier and second content key starting position, receive the second content key, store the second content key in memory, and associate the second content key with the first asset identifier and the second content key starting position when the second content key is not stored in memory.

In yet another embodiment again, the first content key starting position designates the starting location of a portion of the content that is encrypted using at least one derived key generated using the first content key and the first derived key starting position designates the starting location of a portion of the content that is encrypted using the first derived key.

In a yet further additional embodiment, the key derivation application directing the processor to generate a first derived key using at least the first content key and the first position playback position also includes the key derivation application directing the processor to generate a first derived key using at least the first content key, the first playback position, and a license key issued to a plurality of conditional access servers.

In yet another additional embodiment, the request for a first derived key also includes the type of the content, and the key derivation application directing the processor to generate a first derived key using at least the first content key and the first playback position also includes the key derivation application directing the processor to generate a first derived key using at least the first content key, the first playback position, and the type of the content.

In a further additional embodiment again, the key derivation application directing the processor to generate a first derived key using at least the first content key and the first playback position also includes the key derivation application directing the processor to generate a first derived key using at least the first content key, the first playback position, and the derived key expiration time.

In another additional embodiment again, the key derivation application directing the processor to generate a first derived key using at least the first content key and the first playback position also includes the key derivation application directing the processor to generate a first derived key using at least the first content key, the first playback position, and the asset identifier.

In still yet another embodiment again, the key derivation application also directs the processor to receive a derivation algorithm identifier that identifies the algorithm to be used in generating the first derived key.

DETAILED DISCLOSURE

Figure 1:
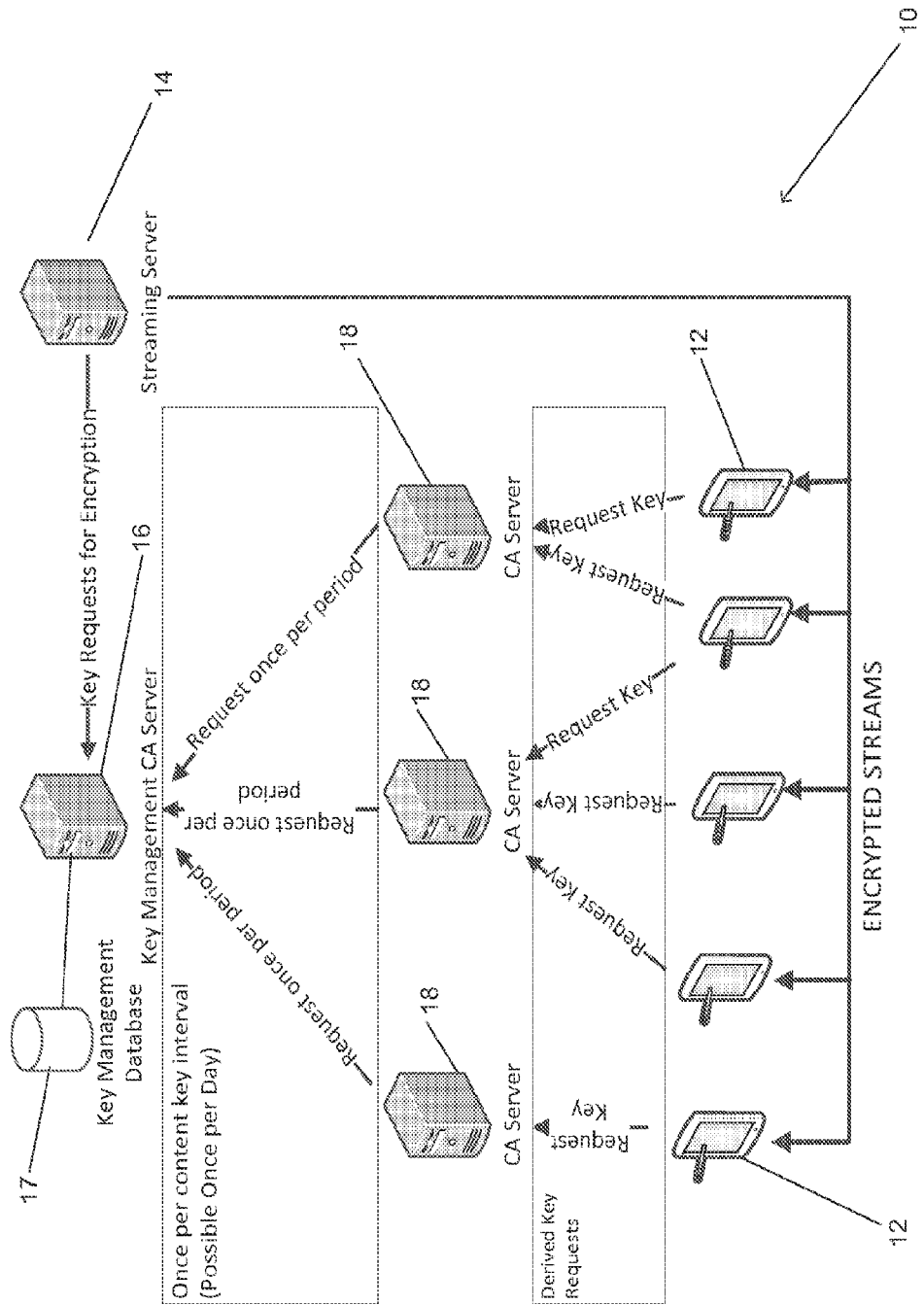
FIG. 1 conceptually illustrates a distributed or hierarchical Conditional Access (CA) system including synchronized key generation across multiple CA servers in accordance with an embodiment of the invention.

Turning now to the drawings, systems and methods for synchronized key generation across multiple Conditional Access (CA) servers in accordance with embodiments of the invention are illustrated. In traditional CA systems, keys generated by the CA system can be stored in a database. As more content is made available the database grows. The provision of live streaming content can be particularly problematic, because new keys may need to be added to the database frequently. In many instances, live streams provided using the HTTP Live Streaming (HLS) system developed by Apple, Inc. of Cupertino, Calif. involve changing the key used to access the streamed content approximately every few minutes (or even seconds). Similarly, MPEG-DASH allows for frequent key changes (also called key rotation). This is in comparison to traditional CA systems that utilize ECMs which are delivered in-band with the content. Traditional CA systems are typically centralized without the need to distribute keys frequently to other locations (such as regional head-ends). In other embodiments, the addition of such keys can cause the size of the database containing the keys to become unwieldy in size over time. As the database grows, the time taken for a CA server to query the database will typically increase over time. Furthermore, playback devices can request keys to access live streaming content from multiple CA servers. Accordingly, the key database can become a single point of contention as all of the servers are attempting to obtain copies of the keys from the database as the keys are being generated. This single point of contention can cause load balancing scalability to be limited. Also keeping all CA servers in sync all the time becomes problematic. Furthermore, there is a significant increase in key management traffic when the population of devices or the amount of content grows.

Systems and methods in accordance with embodiments of the invention can involve the use of synchronized key derivation to enable CA servers to deterministically derive keys in a cryptographically secure fashion. Instead of generating a large number of keys for every piece of content (irrespective of content type), a smaller number of content keys can be generated for a particular piece of content and placed in a key management database. The content key can then be used to seed a deterministic process that can generate multiple derived keys based upon pieces of information describing a particular piece of content, which can include (but is not limited to) any combination of: the requested content, the type of the requested content (e.g. VOD or DTV/live stream), a license key, and/or a playback position within the requested piece of content. In a number of embodiments, a CA system can also use a derived key expiration time in the generation of the derived key. In several embodiments, a license key is created that is provided to one or more CA servers in order to control which CA server(s) are allowed to perform the key derivation function. Some CA servers may get access to more content than others, e.g., when different regional head-ends have rights for only a subset of all the available content; of if this is a hosted CA system where each CA server represents a local service operator. In this way, a license key can be considered a "group" key distributed to the "group" of CA servers permitted to use the license key in generating derived keys. Both the content key and the license key can be used in the generation of derived keys in accordance with embodiments of the invention. In several embodiments, a license key is provided to CA servers only in out-of-band manner separate from the communication paths by which content keys are distributed. For example, license keys may be provided on an external drive such as a USB memory stick or by encrypted email such as email utilizing PGP (Pretty Good Privacy). In this way, a rogue or unauthorized device or server that contacts a key management server to obtain a content key may be prevented from generating a derived key because it cannot obtain a license key.

The deterministic nature of the derived key is such that the derived key can be repeatedly generated provided the generating process has access to the same information. Therefore, a CA system can be constructed in which a key management CA server maintains the key management database and multiple CA servers respond to key requests from playback devices. Architecting a CA system in this manner enables the use of multiple CA servers in a load balancing configuration and/or enables the construction of a wholesale/retail CA system in which a key management server acts as a wholesale CA server and one or more CA servers act as retail CA servers. In several embodiments, a wholesale CA server is responsible for controlling access to a set of content that can be accessed via different retail OTT services. In many instances, different retail OTT services are entitled to access different subsets of the total content available via the wholesale CA server. Therefore, the wholesale CA server can validate that a retail CA server requesting the content key for a piece of content has permission to distribute the identified content. In many embodiments, the wholesale CA server (the Key Management CA server) encrypts all content and provides a subset of the keys to the retail CA servers which authorize/entitle the subset of end-user devices that belong to it. In other embodiments, a wholesale CA server provides content or derived key(s) to a streaming server and the streaming server encrypts content using derived key(s). In further embodiments, a wholesale CA server encrypts some content and a streaming server some content.

When a playback device makes a key request to a retail CA server, the retail CA server can request an appropriate content key from the wholesale server and then use information including information concerning a playback location within the requested content to deterministically generate a derived key to provide to the playback device. The retail CA server can then securely store the content key, avoiding the need to request keys from the wholesale CA server and/or the key management database.

In many embodiments, the content key can be changed on a position interval during playback. Changing the content key effectively changes the key derivation algorithm input, causing the old derivation input to be invalid. Using a predetermined interval enables all of the CA servers to know at exactly what instance to start using the newly generated content key to commence key derivation. Forcing a retail CA server to request a new content key periodically from a wholesale CA server provides a mechanism to deny entitlements to content by expiring the old content key. By configuring the retail CA server to request a new content key, content access entitlements can be enforced at the time of the new content key request. In many embodiments, a retail CA server can be denied a content key upon requesting a new content key and therefore cannot provide access to content by generating derived keys. The retail CA server may also be configured to delete content keys within a certain period of time, forcing the retail CA server to request the content key again when needed as another mechanism for enforcing retail entitlements.

CA systems that include synchronized key generation and processes for performing synchronized key generation in accordance with embodiments of the invention are described further below.

CA Systems Including Synchronized Key Generation

CA systems in accordance with many embodiments of the invention involve a key management CA server that can serve keys to one or more CA servers, which receive key requests from playback devices. In many embodiments, a piece of content is referenced using an Asset Identifier (ID) and at least one content key is generated by the key management CA server that is associated with the Asset ID in a key management database. The key management CA server can use information including the content key to deterministically generate derived keys that can be utilized in the encryption of content. When the content is requested by the playback device, a CA server can obtain the content key from the key management CA server and then use the same deterministic process to generate derived keys that can be provided to a playback device to facilitate playback of the encrypted content.

A CA system including synchronized key generation across multiple CA servers in accordance with an embodiment of the invention is illustrated in FIG. 1. The CA system 10 includes multiple playback devices 12 that can request the streaming of content from a streaming server system 14 (note that there may be multiple streaming servers for scalability reasons). In many embodiments, the streaming server system encrypts the content prior to distribution using one or more derived keys provided by a CA system. In other embodiments, the streaming server system can generate one or more derived keys using one or more content keys and use the derived keys to encrypt content. It can be a pre-encryption of on-demand content or real-time encryption of live content. As described above, a key management CA server 16 can generate at least one content key and can use the content key to generate derived keys that are provided to the streaming server system 14 to be used in the encryption of the content. In several embodiments, a key management CA server 16 provides at least one content key to the streaming server system and the streaming server system can generate derived keys with which to encrypt content. In still further embodiments, a key management CA server 16 generates derived keys and encrypts content using the derived keys. The at least one content key can be associated with an identifier of the content (Asset ID) within a key management database 17 maintained by the key management CA server 16.

When a playback device 12 requests content from the streaming server system 14, the playback device requests keys from a CA server 18 to enable playback of encrypted content received from the streaming server system. In response to a key request, the CA server 18 requests a content key from the key management CA server 16. The key management CA server 16 can query the key management database 17 to retrieve the appropriate content key. In several embodiments of the invention, different portions of a piece of content are encrypted with derived keys generated using different content keys. The CA server 18 can provide an asset identifier that identifies a piece of content and optionally a playback position within the piece of content, content key starting position within the piece of content, or other content key identifier to the key management CA server 16 to identify the correct content key to retrieve.

A playback position can be defined in a variety of ways including, but not limited to, a byte-offset from the beginning of the content file, number of seconds since the beginning of the piece of content, or an absolute time (e.g., with live real-time content). One skilled in the art will recognize that alternative measures for defining a position within a piece of content or file (or group of files) containing a piece of content may be utilized with embodiments of the invention, including other measures known in the art.

A content key interval can be determined under any of a variety of criteria as appropriate to the specific application such as, but not limited to, the time period that the content key is valid and/or used by a streaming server or key management CA server in generating derived keys for the encryption of content. In some embodiments, a content key interval may be defined within the context of playback time duration of a piece of content (e.g., from the beginning of the piece of content to 300 seconds into the presentation of the content, 300 seconds from the beginning of the piece of content to 600 seconds from the beginning of the piece of content). In other embodiments, a content key interval may be defined in real-time (e.g., 12 AM Oct. 31, 2014 to 12 AM Nov. 1, 2014 UTC). In many embodiments, the start of each content key interval within a piece of content can be referred to as a content key starting position. Similar to a playback position, a content key starting position can be defined in a variety of ways including, but not limited to, a byte-offset from the beginning of the content file, number of seconds since the beginning of the piece of content, or an absolute time (e.g., with live real-time content).

The content key is provided to the CA server 18 and the CA server can commence generating derived keys, which are provided to the playback device 12 to enable the playback of the encrypted content being streamed by the streaming server system 14.

In several embodiments, a playback device 12 that makes a key request identifies the content, the type of the content, and a playback position within the content. Instead of retrieving the key being requested from the key management database 17, information including (but not limited to) the information provided by the playback device can be used by the CA server 18 along with a content key retrieved by the CA server from the key management CA server to generate derived keys. In further embodiments, a CA server need only receive a particular content key once from the key management CA server and can store the content key for subsequent use in responding to any number of requests from playback devices for a derived key generated from the same content key.

In a number of embodiments, a license key is also assigned to each CA server. In other embodiments, the CA server maintains a copy of the license key (which may not be unique to a particular piece of content).

Playback devices utilized in CA systems in accordance with an embodiment of the invention can be any type of consumer electronics device that can be utilized to play back content on an IPTV system including (but not limited to) personal computers, tablet computers, mobile phones, Internet connected televisions, Internet connected optical disk players, tablets, game consoles and set top boxes.

Figure 1A:
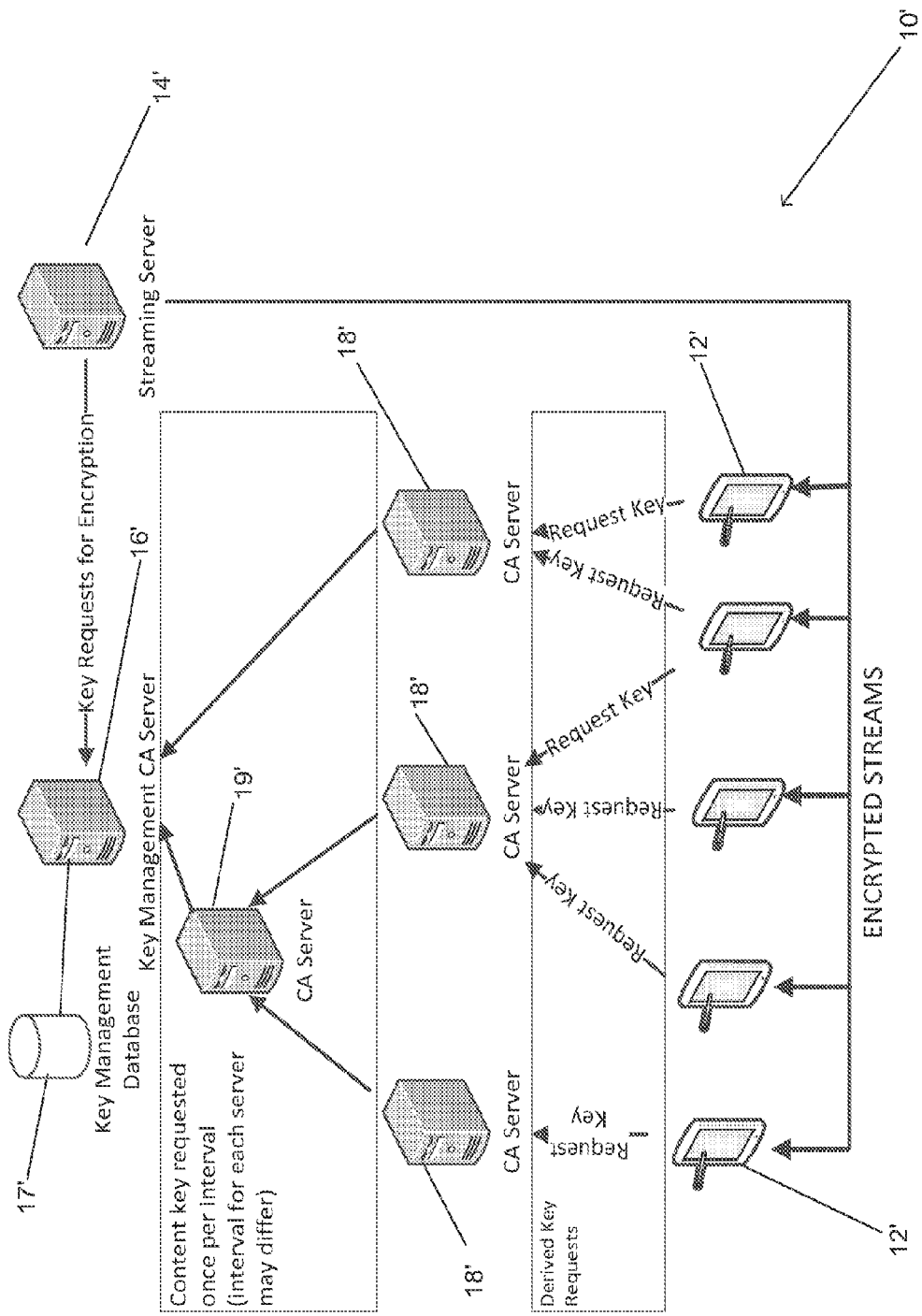
FIG. 1A conceptually illustrates a distributed CA system including two tiers of CA servers for synchronized key distribution in accordance with an embodiment of the invention.

In several embodiments of the invention, CA servers may be configured in two or more tiers to extend the load balancing capabilities such that one or more CA servers in a first tier communicating directly with a key management CA server can distribute content key(s) to other CA servers in a second tier (and so on with additional tiers). A CA system including two tiers of CA servers for synchronized key distribution in accordance with an embodiment of the invention is illustrated in FIG. 1A. In the illustrated embodiment, playback devices 12' may request derived keys from the second tier of CA servers 18'. A second tier CA server 18' may request a content key from a first tier CA server 19'. A first tier CA server 19' may request a content key from a key management CA server 16'. Requests for derived keys may be similar to the requests for derived keys made by playback devices shown in FIG. 1 and requests for content keys may be similar to the requests for content keys made by CA servers in FIG. 1. The key interval at which CA servers 18' and 19' request content keys may be the same or may be different. Although a specific number of servers is illustrated in FIG. 1A, one skilled in the art will recognize that any number of servers and tiers of servers may be utilized to distribute key requests and synchronize key generation in a CA system as appropriate to a specific application in accordance with embodiments of the invention.

Figure 2:
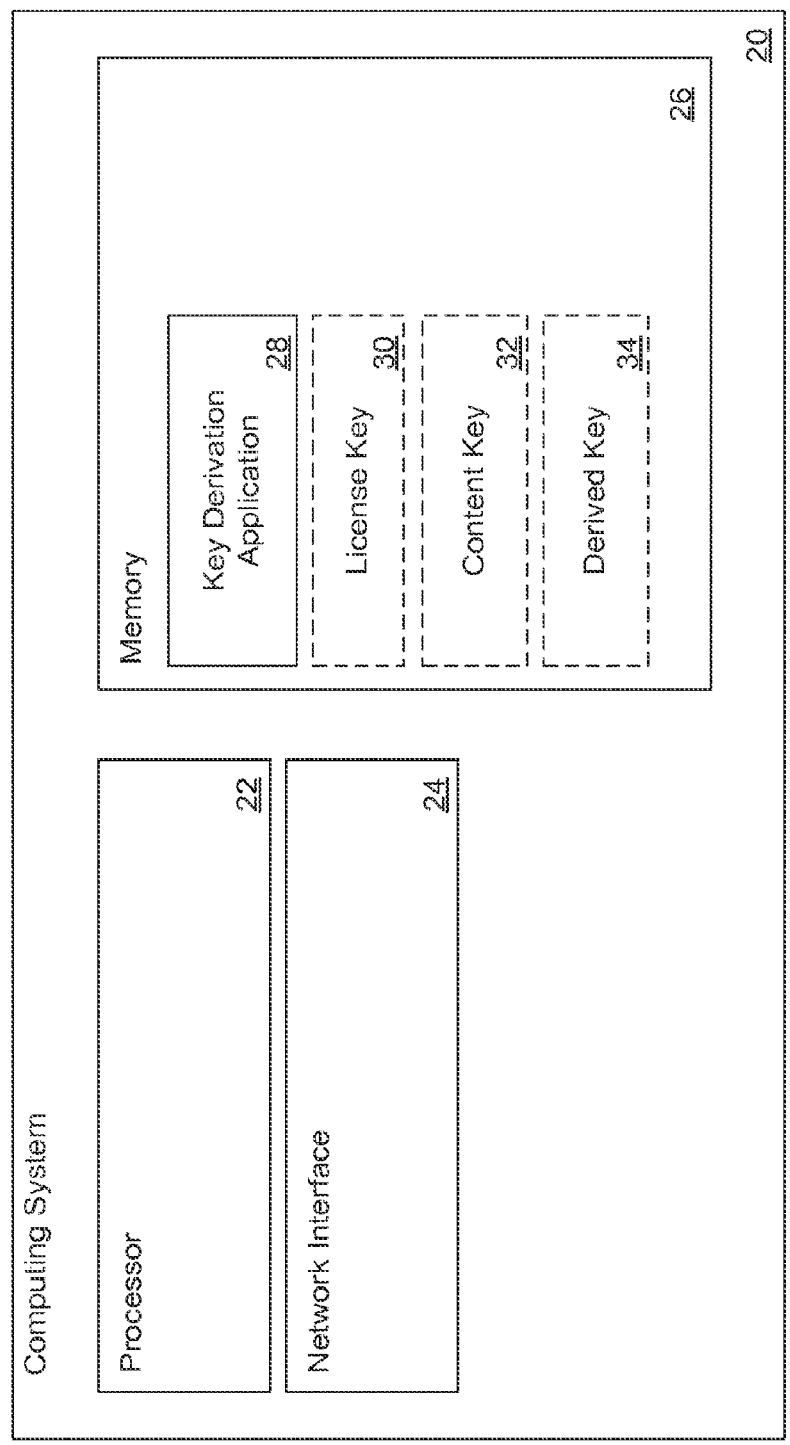
FIG. 2 illustrates a computing device configured to generate a derived key in accordance with an embodiment of the invention.

Both the key management CA server system 16 and the CA systems 18 that communicate with the key management CA server system can be implemented as server applications on conventional server computing hardware. A computing device that can be utilized to implement a key management CA server, CA server, or playback device that is configured to generate a derived key in accordance with an embodiment of the invention is illustrated in FIG. 2. The computing system 20 includes a processor 22, a network interface 24 and memory 26. The memory can include a variety of data and applications including (but not limited to) a key derivation application 28. In several embodiments, the computer system obtains a license key 30 and a content key 32 and stores them in memory 26. The license key 30 and the content key 32 can be utilized in combination with other information to generate one or more derived keys 34. The CA server is typically maintained in a secure location and/or it may utilize secure server hardware including encrypted storage, protected RAM, obfuscated code and other protections. It may also utilize secure login and access control, multifactor authentication, smartcards, secure token IDs, and/or any other security technique appropriate to the requirements of a specific application in accordance with embodiments of the invention.

In a variety of embodiments, the memory 26 includes circuitry such as, but not limited to, memory cells constructed using transistors, that are configured to store instructions. Similarly, the processor 22 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Although specific architectures for CA systems involving synchronized key generation in accordance with embodiments of the invention are described above with reference to FIGS. 1, 1A, and 2, any of a variety of architectures, including those which store data or applications on disk or some other form of storage and are loaded into volatile memory at runtime, and/or systems that are distributed across multiple physical servers, can also be utilized. Methods for derived key generation in accordance with embodiments of the invention are discussed further below. Specialized HW to derive keys may also be utilized.

Derived Key Generation

Figure 3:
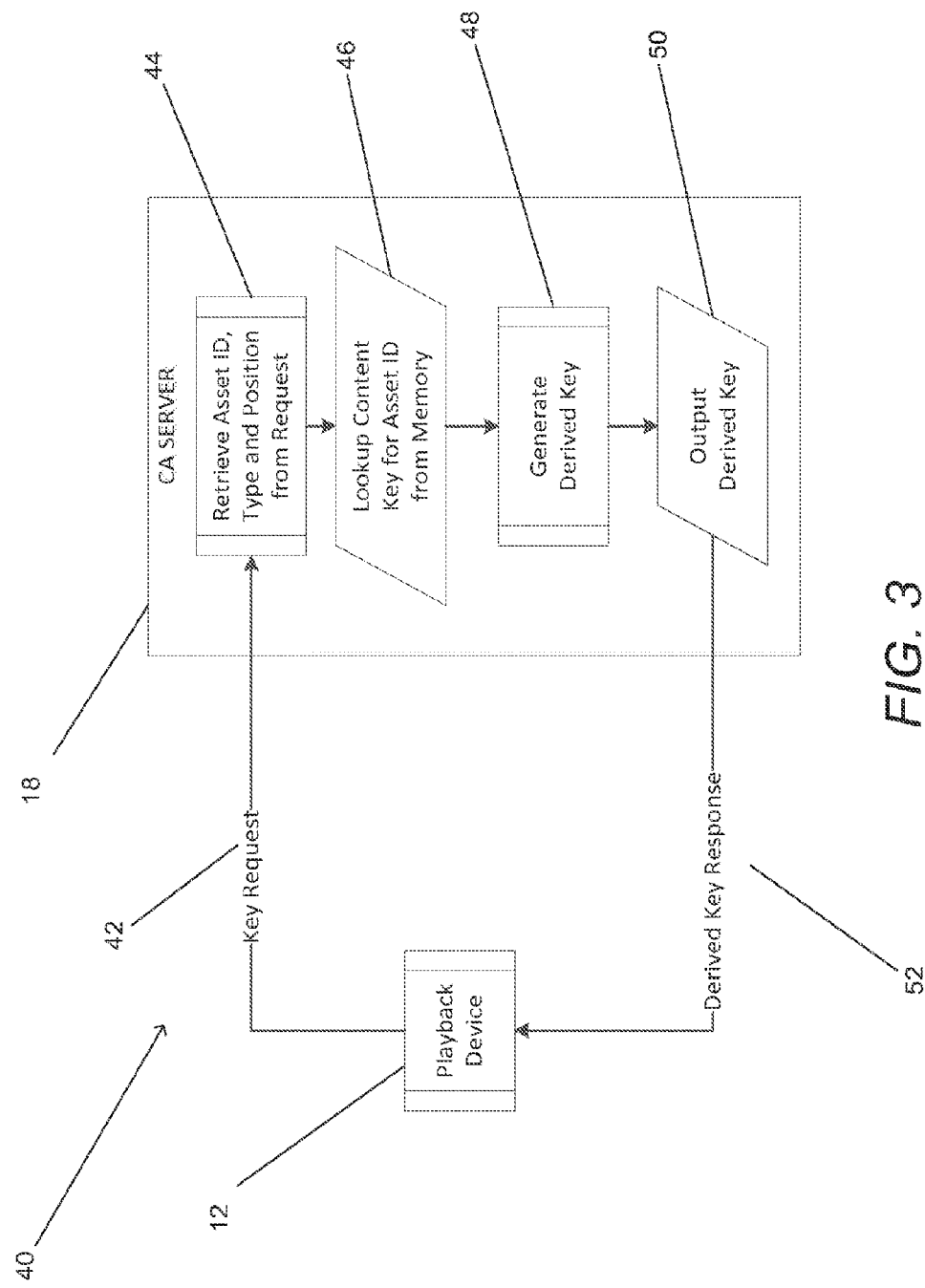
FIG. 3 is a flow chart illustrating a process for generating a derived key in accordance with an embodiment of the invention.

During playback, derived keys are generated by a CA server in response to requests for keys from a playback device. A process for generating a derived key in accordance with an embodiment of the invention is illustrated in FIG. 3. The process 40 commences when a playback device 12 requests (42) a derived key from a CA server 18. In several embodiments, a playback device 12 that makes a key request identifies the content, optionally the type of the content, a playback position within the content, and/or other information concerning the content or keys as discussed further above. The CA server 18 can use the information provided by the playback device in the key request to generate a derived key. Note that key management CA server 16 can also perform the same key derivation in order to provide keys to the streaming server (Encryptor) 14.

In the illustrated embodiment, the process utilized by the CA server 18 to generate a derived key includes retrieving (44) an Asset ID, a playback position, and optionally content type information from the key request received from the playback device 12. The Asset ID and optionally playback position can be utilized to lookup (46) a content key 32 in memory. In several embodiments, a particular content key is associated with a content key interval (a portion of the content encrypted using derived keys generated using the content key) and a content key starting position that designates the location of the beginning of the content key interval within the piece of content. In such embodiments, the playback position can be used to identify the closest preceding content key starting position, which would indicate that the playback position is within that content key interval. The identified content key starting position may be then be used to look up the content key or other key identifier that can be used to look up the content key.

In the event the content key 32 is not stored in the memory of the CA server 18, then the CA server can use the Asset ID (and optionally the playback position, content key starting position, or other key identifier) to request the content key 32 from a key management CA server. The content key 32 can be utilized in combination with additional information to generate (48) a derived key 34. The CA server 18 then outputs (50) the derived key 34 in a key response (52) that is provided to the playback device that made the key request. In several embodiments, the CA server may store the derived key 34 in memory so that it can send the derived key in response to future key requests from playback devices. In other embodiments, the CA server deletes the derived key 34 from memory after it is sent in response to the key request and generates the derived key 34 each time it receives a key request.

Although specific processes for providing a playback device with a derived key in response to a key request using a content key are described above with reference to FIG. 3, any of a variety of process can be utilized to provide keys to playback devices using key derivation processes in accordance with embodiments of the invention. Specific pieces of information that can be utilized in accordance with embodiments of the invention to generate derived keys are described further below.

Figure 4:
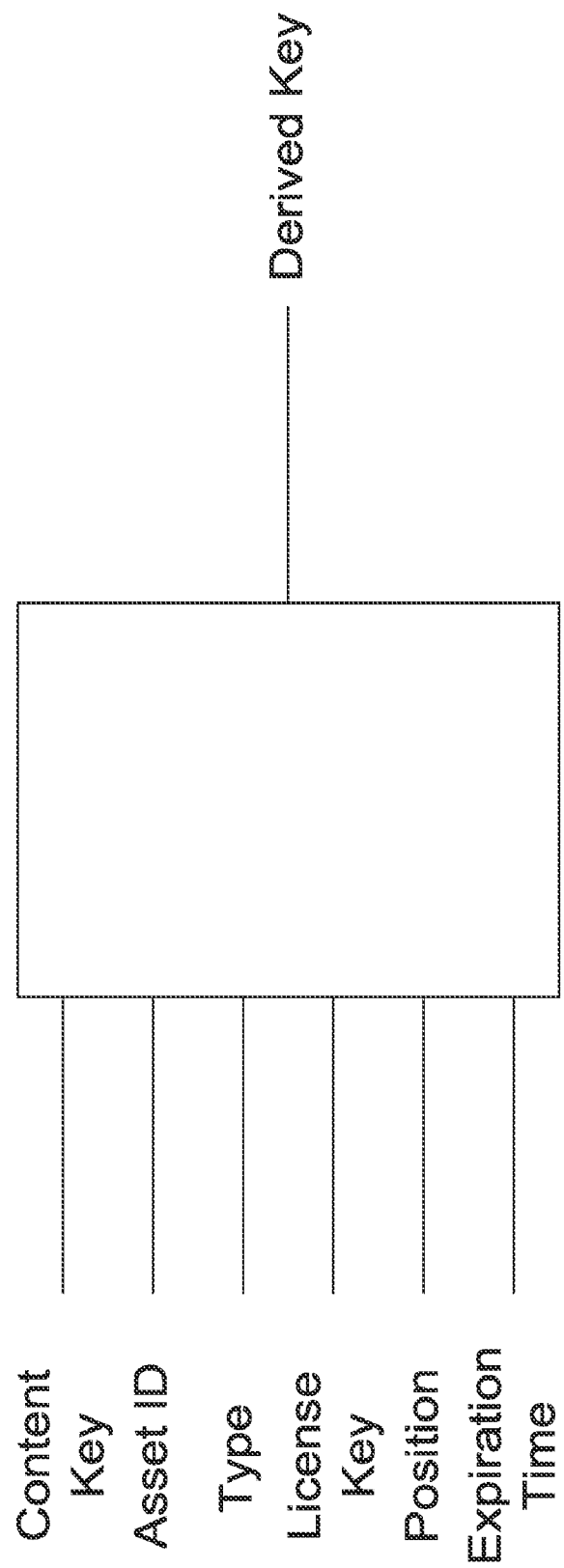
FIG. 4 is a block diagram conceptually illustrating a deterministic process for generating a derived key in accordance with an embodiment of the invention.

As noted above, information provided by a playback device in a key request can be utilized in combination with a content key to generate derived keys that can be utilized by a playback device to decrypt content received via an IPTV system. The specific pieces of information utilized to generate a derived key typically depends upon the requirements of a specific application. A deterministic process for generating a derived key in accordance with an embodiment of the invention is conceptually illustrated in FIG. 4. In the illustrated embodiment, a derived key is generated using a deterministic (one-way) process that takes as inputs a content key, an Asset ID, metadata describing the content (e.g. the content type of the piece of content identified by the Asset ID, the resolution of the content, the bitrate of the a content stream), a cryptographic key that is common to a number of CA servers such as a license key, a playback position, and an expiration time. Metadata describing the content type may also indicate the delivery format of the identified content, such as, but not limited to, video-on-demand (VOD) and pay-per-view (PPV). In many embodiments, the Asset ID, content type, license key, and expiration time are obtained by the playback device as part of a separate process of obtaining permission to stream the content. The playback device can then provide this information in combination with information identifying a playback position within the content.

Other information that may be input into a derivation algorithm in generating a derived key in accordance with embodiments of the invention can include a key identifier and/or a derivation algorithm identifier. A key identifier uniquely identifies a content key. As discussed further above, a piece of content may be associated with multiple content keys that are used to generate derived keys that are used to encrypt the content. Each content key may be associated with a particular portion of the piece of content, where a portion includes a range of playback positions. Retrieval of a content key may utilize a playback position in the associated range of playback positions. As discussed further above, a particular content key may also be associated with a content key starting position within the piece of content so that the content key starting position can be used to retrieve the content key. Retrieval may also alternatively utilize a key identifier for the content key. As an Asset ID identifies a piece of content, a key identifier may be used to distinguish one content key associated with a piece of content from another content key associated with the piece of content. In some embodiments, the Asset ID of a piece of content together with a playback position or content key starting position within the piece of content combine to form a key identifier for a content key associated with the piece of content at that playback position. As will be discussed further below, there may be any number of different derivation algorithms using any of the pieces of information discussed here to generate derived keys in accordance with embodiments of the invention. Identification of the proper derivation algorithm may further be used to enforce rights with respect to which specific streaming server, CA server, and/or playback devices may be enabled to generate valid derived keys by informing those authorized devices which derivation algorithm to use. One skilled in the art will recognize that any subset or all of the pieces of information discussed above may be combined in generating a derived key as appropriate to the requirements of a specific application.

Figure 5:
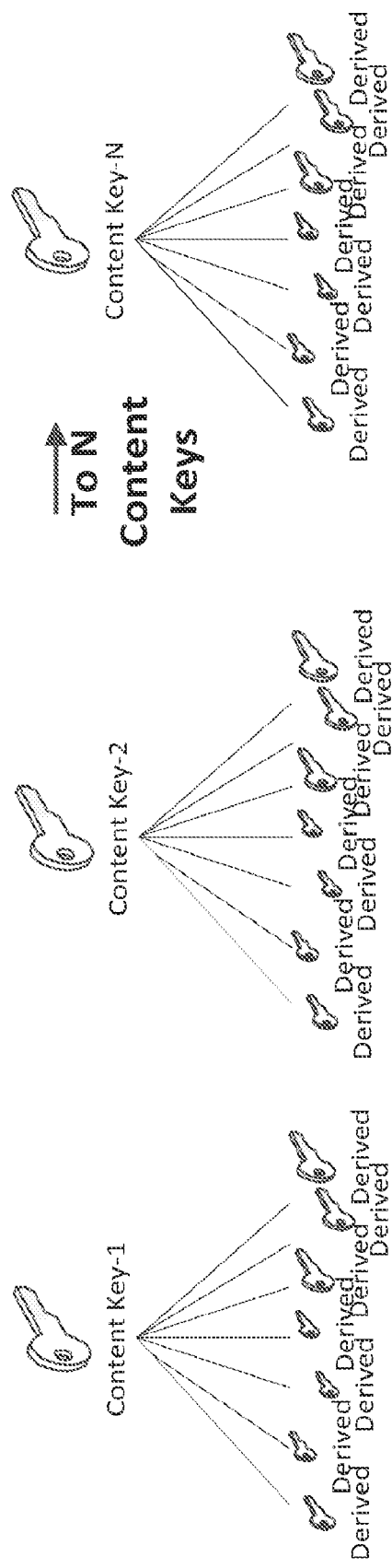
FIG. 5 conceptually illustrates the ongoing generation of derived keys using a sequence of content keys that are each valid for predetermined playback intervals in accordance with an embodiment of the invention.

The Asset ID and optionally the playback position (and/or content key starting position) can be utilized by a CA server to identify an appropriate content key. The encryption of a single piece of content may involve the use of multiple content keys (each associated with a different portion of the content that may correspond to a content key interval) to seed the process used to generate derived keys. FIG. 5 conceptually illustrates the ongoing generation of derived keys to enable content playback using a sequence of content keys that are each valid for predetermined playback intervals in accordance with an embodiment of the invention. In several embodiments, a playback interval is a predetermined period of time that applies to different pieces of content. In some embodiments, a playback interval may be specific to a particular piece of content, such as having an interval equivalent to the run-time or length of the piece of content. In further embodiments, a piece of content is streamed and/or played live in real-time and the playback interval of a content key associated with the content is determined at the time it begins streaming.

When the correct content key is identified, the content key can then be utilized in combination with the information provided by the playback device as inputs to the illustrated process to generate a derived key. The process itself can utilize any of a variety of cryptographic process including (but not limited to) the use of a cryptographic hash function to generate a derived key. The larger the number of bits used to represent the input data and/or to represent the derived key, the more cryptographically infeasible it is to reverse engineer the deterministic process utilized to generate derived keys from the content key. One skilled in the art will recognize that any of the pieces of information chosen as inputs can be combined using various functions or algorithms in any order in a deterministic process as appropriate to the requirements of a specific application in accordance with embodiments of the invention. For example, two inputs may be combined with a hash function, the result of which is combined with a third input with a hash function and so on.

In some embodiments of the invention, an additional input parameter to the deterministic process to generate a derived key is an identifier for which derivation algorithm is used (i.e., the algorithm defining the deterministic process). A key management CA server and associated CA servers may be capable of generating derived keys using various derivation algorithms (although they may or may not utilize only one at a time). As will be discussed further below, a particular CA server may have its rights revoked with respect to some or all content. Processes to exclude the revoked CA server from accessing future content may include providing the remaining authorized CA servers with a new derivation algorithm and/or identifying a different derivation algorithm to use in generating a derived key.

In some embodiments of the invention, a derived key is stored for future reference. In other embodiments, the derived key is deleted from memory once it is sent to the requesting device or server. Because the deterministic process can be used to generate an identical derived key given the same inputs, the derived key can simply be regenerated when needed rather than saved.

Although processes for generating derived keys including specific inputs are described above with reference to FIG. 4, any of a variety of processes that receive a combination of inputs appropriate to the requirements of a specific application can be utilized in accordance with embodiments of the invention.

CA Systems Including Synchronized Key Generation within Playback Devices

Figure 6:
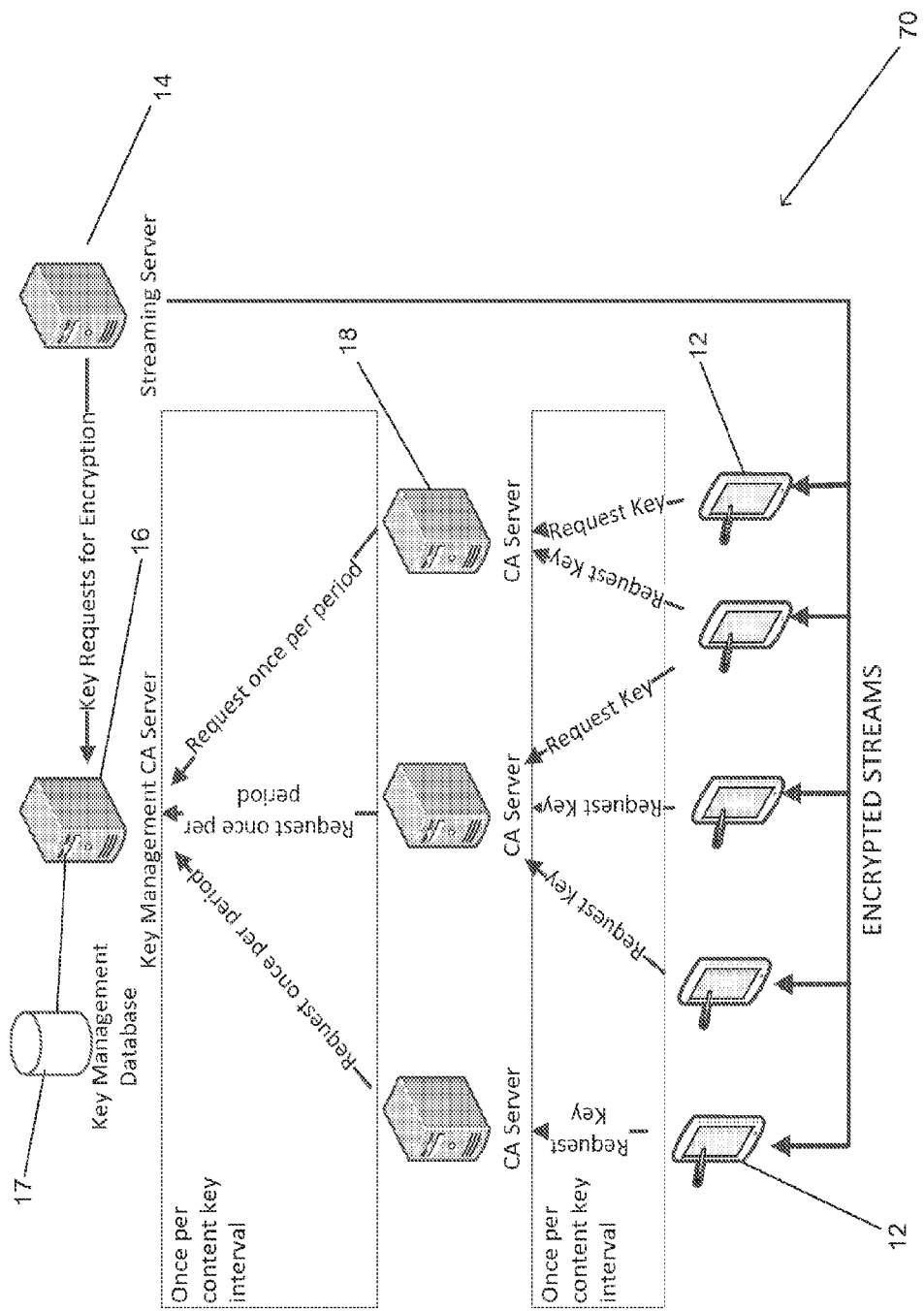
FIG. 6 conceptually illustrates another Conditional Access (CA) system including synchronized key generation across multiple CA servers and playback devices in accordance with an embodiment of the invention.

Although much of the above discussion relates to the synchronized key generation between CA servers, the number of key requests between playback devices and CA servers can also be reduced using synchronized key derivation. A Conditional Access (CA) system including synchronized key generation across multiple CA servers and playback devices in accordance with an embodiment of the invention is illustrated in FIG. 6. The CA system 70 is similar to the CA system 10 illustrated in FIG. 1 with the exception that playback devices 12 include secure hardware or secure software or a combination that can be utilized to generate derived keys using one or more content keys provided by a CA server 18. The playback device 12 can utilize similar processes to those outlined above to generate derived keys. The ability of the playback device 12 to generate derived keys can reduce the number of key requests between the playback device 12 and the CA system. In various embodiments, the playback device could request the content key directly from the key management CA server 16 and eliminate the need for the hierarchical CA servers 18. In several embodiments, playback devices that are capable of generating derived keys may be implemented as a computing device as illustrated in FIG. 2 and discussed further above with respect to FIG. 2 in accordance with embodiments of the invention.

While specific CA systems in which playback devices can generate derived keys are described above with respect to FIG. 6, any of a variety of CA systems can be constructed in which playback devices are able to generate derived keys in accordance with embodiments of the invention.

Authentication of CA Servers and Breach Recovery

Much of the above discussion, as in many digital rights management systems, assumes some level of trust between participating machines. In many embodiments of the invention, a CA server may be required to register with a key management CA server before it is provided with any content key(s). Registration may require authentication (e.g., via an SSL certificate or other trusted identification) and an entitlement check for the pieces of content and/or types of content that the CA server may access for further distribution. A CA server may be authorized to receive content keys only for content to which it is entitled. In many embodiments of the invention, processes for registration of a CA server may include the key management CA server providing the CA server with a license key and/or the derivation algorithm(s) for generating derived keys from a content key.

If a CA server is compromised, a key management CA server system may send an alert or other message to the CA servers (and may exclude the compromised server) that the key derivation algorithm will be changed. The CA servers may then be required to reauthenticate with the key management CA server to receive the new key derivation algorithm. Similarly, a new license key may be distributed to a subset of the CA servers excluding the compromised CA server. The license key may be distributed and used in securing content as an input to a key derivation algorithm as discussed further above.

Figure 7:
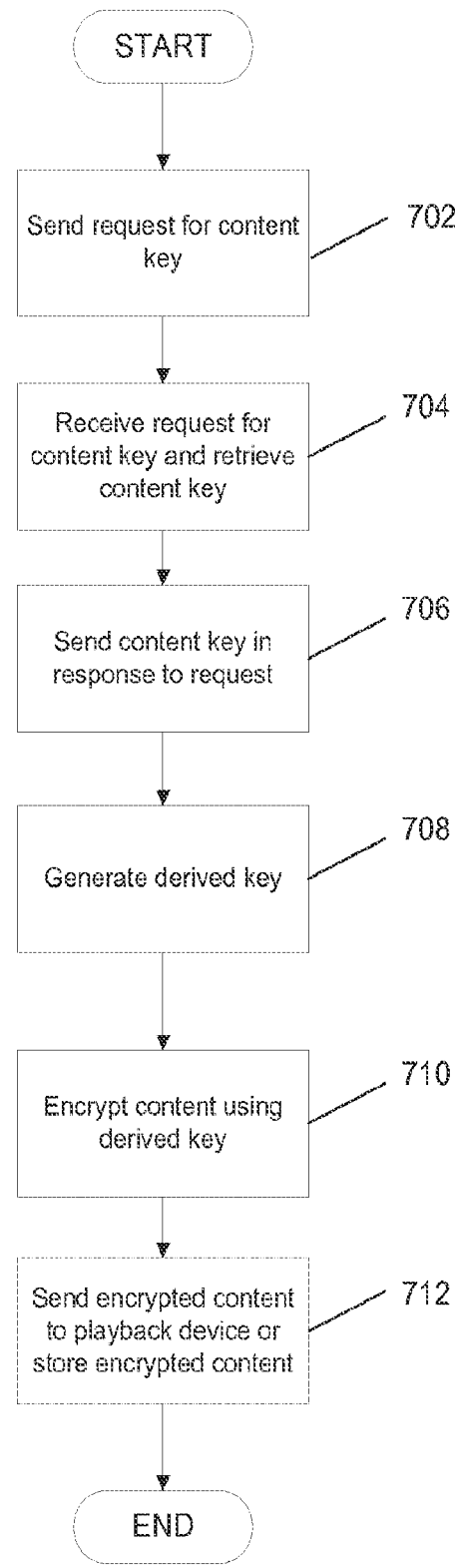
FIG. 7 is a flow chart illustrating a process for generating derived keys and encrypting content using derived keys by a streaming server.

Processes for Providing Streaming Servers with Derived Keys for Encrypting Content In many embodiments of the invention, a streaming server generates at least one derived key from a content key using a derivation algorithm such as those discussed further above and utilizes the derived key(s) for content encryption. A process for generating a derived key and utilizing the derived key in encrypting content by a streaming server in accordance with embodiments of the invention is illustrated in FIG. 7.

In the illustrated process, a streaming server requests (702) a content key from a key management CA server. In further embodiments, the streaming server requests the content key once per content key interval. The streaming server may store the content key in memory so that it can use the content key to generate derived keys within the content key interval and does not need to send further requests. A request for a content key may include at least an asset identifier (ID) that specifies a piece of content and, optionally, a playback position and/or content key starting position (or other key identifier). In some embodiments, different portions of a piece of content may be encrypted using derived keys generated using different content keys. The streaming server may inform the key management CA server before or after encryption is performed which content key is intended to encrypt which portion of content or, alternatively, the key management CA server may inform the streaming server which content key to use to encrypt which portion of content. In several embodiments, the key management CA server does not initially have the content key and is provided with the content key by the streaming server.

In several embodiments a streaming server requests a new content key from a key management CA server once per content key interval. With the requested content key, the streaming server can generate one or more derived keys with which to encrypt content without having to send additional requests for content keys. As discussed further above, a content key interval can be determined under any of a variety of criteria as appropriate to the specific application such as, but not limited to, the time period that the content key is valid and/or used by a streaming server or key management CA server in generating derived keys for the encryption of content. In some embodiments, a content key interval may be defined within the context of playback time duration of a piece of content (e.g., from the beginning of the piece of content to 300 seconds into the presentation of the content, 300 seconds from the beginning of the piece of content to 600 seconds from the beginning of the piece of content). In other embodiments, a content key interval may be defined in real-time (e.g., 12 AM Oct. 31, 2014 to 12 AM Nov. 1, 2014 UTC). In many embodiments, the start of each content key interval within a piece of content can be referred to as a content key starting position. Similar to a playback position, a content key starting position can be defined in a variety of ways including, but not limited to, a byte-offset from the beginning of the content file, number of seconds since the beginning of the piece of content, or an absolute time (e.g., with live real-time content). One skilled in the art will recognize that alternative measures for defining a position within a piece of content or file (or group of files) containing a piece of content may be utilized with embodiments of the invention, including other measures known in the art.

The key management CA server receives (704) the request and retrieves a content key associated with the asset identifier (and playback position or content key starting position if received) from memory. If an appropriate content key is not stored in memory, the key management CA server may generate a new content key and store it in memory. The key management CA server sends (706) the content key to the streaming server. The streaming server generates (708) at least one derived key using the content key and, optionally, other information such as the inputs described further above in a derivation algorithm. The streaming server encrypts (710) at least a portion of a piece of content using the derived key. Additional derived keys may be generated and used to encrypt additional portions of content. The streaming server may then send (712) encrypted content to a playback device or store the encrypted content for future use.

In several embodiments, each derived key is used to encrypt content for a period of time and/or duration of playback time of the content referred to as a derived key interval. A derived key interval can be determined by any of a variety of criteria as appropriate to the specific application such as, but not limited to, the time period that the derived key is valid and/or used by the streaming server or key management CA server in encrypting content or the portion (e.g., measured in time or bytes) of the piece of content encrypted using a particular derived key. In many embodiments, upon the passing or expiration of a derived key interval, a currently valid derived key is no longer used to encrypt content and therefore cannot be used to decrypt content that is encrypted later. Similarly, upon the passing or expiration of a content key interval, derived keys generated using the content key associated with the content key interval cannot be used to decrypt content in a different content key interval. In several embodiments, a derived key interval is shorter than a content key interval. A content key interval may be measured by a specific length of time (e.g., 5 minutes, 24 hours) or length within a file in bytes or be related to the derived key interval (e.g., a content key interval that is 1,000 derived key intervals results in a content key change after 1,000 derived key changes). A derived key interval may be a specific length of time (e.g., 30 seconds, 5 minutes) or length within a file in bytes. One skilled in the art will recognize that a content key interval may be based on various lengths of time or on various numbers of derived key rotations/intervals as appropriate to a specific application in accordance with embodiments of the invention.

Figure 5A:
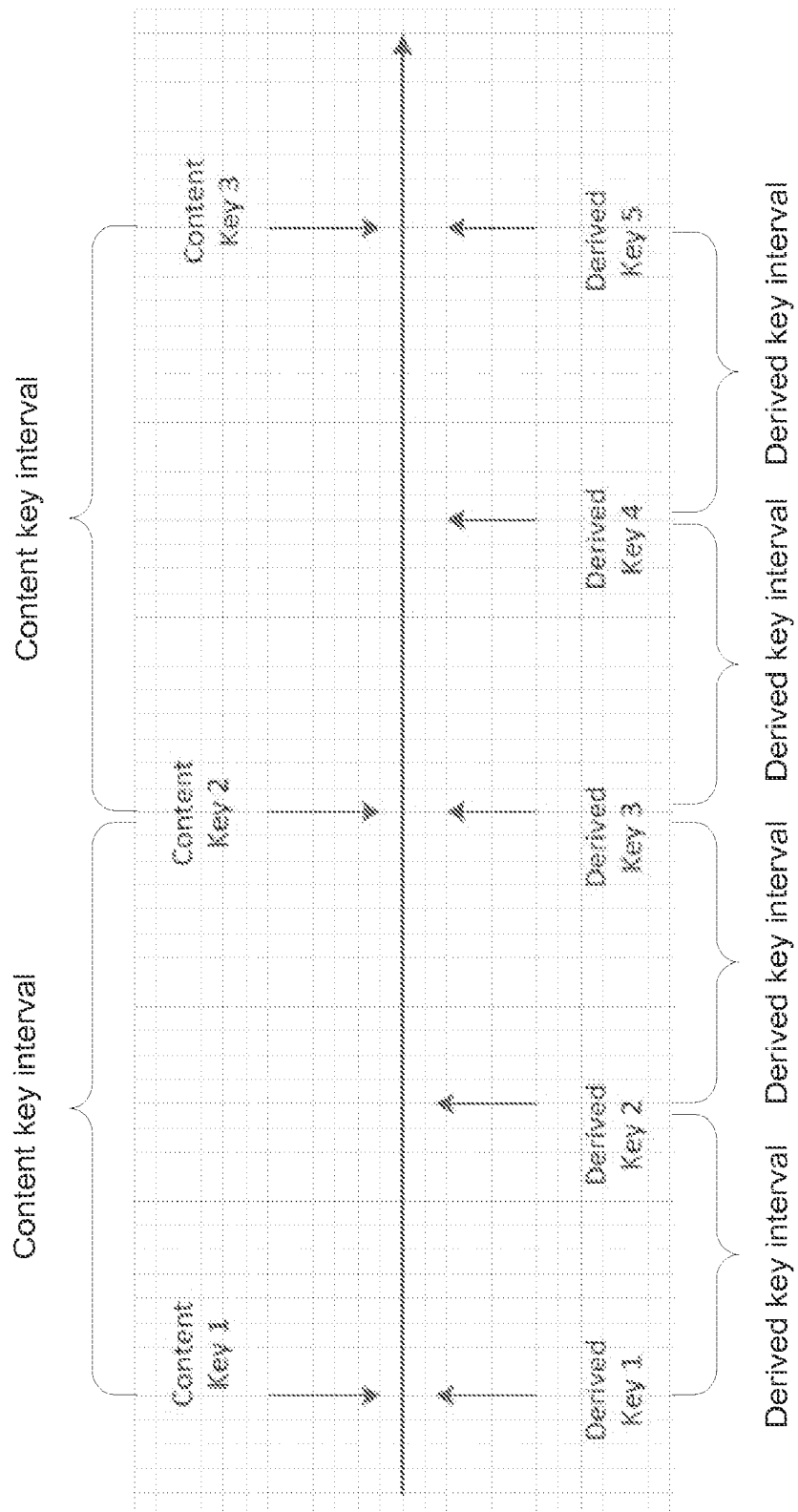
FIG. 5A conceptually illustrates a series of content key starting positions and derived key starting positions within a piece of content in accordance with an embodiment of the invention.

In many embodiments, a content key interval commences at a content key starting position that designates a location where the content key interval begins within a piece of content or within one or more files that make up a piece of content. In several embodiments, a derived key interval commences at a derived key starting position that designates a location where the derived key interval begins within a piece of content or within one or more files that make up a piece of content. In several embodiments, one or more derived key starting positions may be colocated with content key starting positions. A series of content key starting positions and derived key starting positions within a piece of content in accordance with an embodiment of the invention is illustrated in FIG. 5A.

In the next derived key interval, the streaming server may generate a second or subsequent derived key for content encryption. In the next content interval, the streaming server may request a second or subsequent content key with which to generate a derived key(s).

Figure 8:
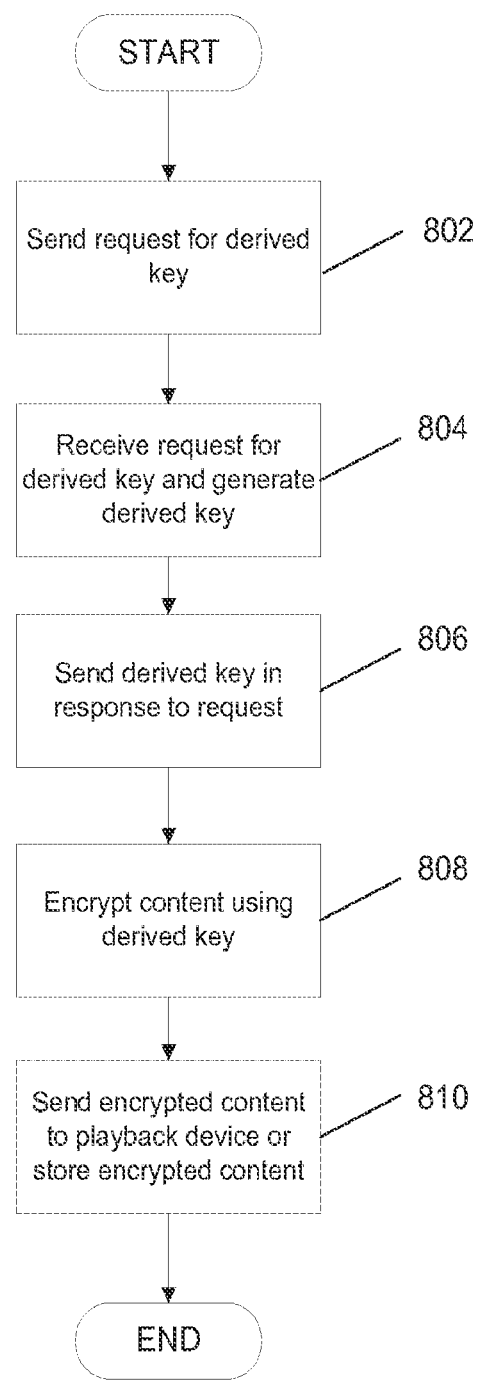
FIG. 8 is a flow chart illustrating a process for requesting derived keys from a key management CA server and encrypting content using derived keys by a streaming server.

In additional embodiments of the invention, a key management CA server generates at least one derived key from a content key using a derivation algorithm such as those discussed further above and provides the derived key(s) to a streaming server for content encryption. A process for generating a derived key using a key management CA server, providing the derived key to a streaming server, and encrypting content using the derived key by a streaming server in accordance with embodiments of the invention is illustrated in FIG. 8.

A streaming server sends (802) a request for a derived key to a key management CA server. A request for a derived key may include at least an asset identifier (ID) that specifies a piece of content and, optionally, a playback position, content key starting position, or other key identifier. In some embodiments, different portions of a piece of content may be encrypted using derived keys generated using different content keys. In such embodiments, a streaming server simply requesting and receiving derived keys may not require knowledge of which content keys apply to which portions of a particular piece of content.

In several embodiments a streaming server requests a new derived key from a key management CA server once per derived key interval. The key management CA server receives (804) the request, retrieves the appropriate content key from memory (and optionally generates a new content key if not already stored in memory), and generates at least one derived key using the content key and, optionally, other information such as the inputs described further above in a derivation algorithm. A content key may be retrieved similar to the content key retrieval discussed further above with respect to the process illustrated in FIG. 7, such as by determining a content key starting position. The key management CA server sends (806) the derived key to the streaming server. The streaming server encrypts (808) at least a portion of a piece of content using the derived key. Additional derived keys may be generated by the key management CA server and sent to the streaming server to encrypt additional portions of content. Additional derived keys may be generated at a predetermined derived key interval and/or may be generated when requested by the streaming server. The streaming server may send (810) encrypted content to a playback device or store the encrypted content for future use. In the next derived key interval, the streaming server may request a second or subsequent derived key for content encryption and the streaming server generate a second or subsequent derived key.

Although specific processes for generating derived keys and utilizing derived keys in encrypting content are discussed above with respect to FIGS. 7 and 8, one skilled in the art will recognize that any of a variety of processes and variations of processes can be used for obtaining encrypted content using derived keys in accordance with embodiments of the invention. Processes for obtaining derived keys and decrypting content using derived keys are discussed below.

Figure 9:
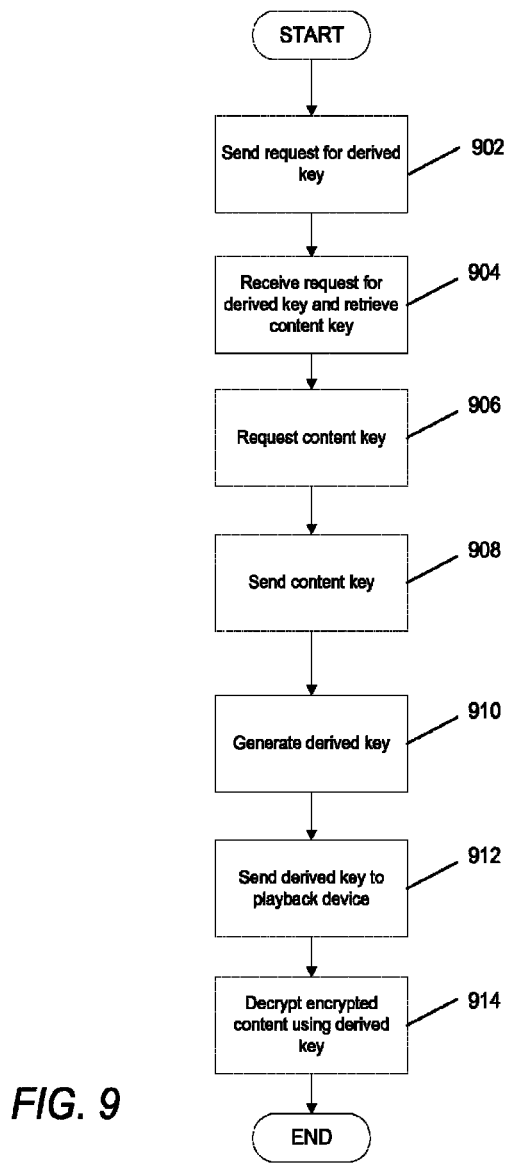
FIG. 9 is a flow chart illustrating a process for requesting derived keys from a CA server and decrypting content using derived keys by a playback device.

Processes for Providing Playback Devices with Derived Keys for Decrypting Content In many embodiments of the invention, a CA server generates at least one derived key from a content key using a derivation algorithm such as those discussed further above and provides the derived key(s) to a playback device. A process for generating a derived key by a CA server and decrypting content using the derived key by a playback device in accordance with embodiments of the invention is illustrated in FIG. 9.

The process includes the playback device sending (902) a request for a derived key to a CA server. A request for a derived key may include at least an asset identifier (ID) that specifies a piece of content and, optionally, a playback position. In some embodiments, different portions of a piece of content may be encrypted using different content keys.

In several embodiments the playback device requests a new derived key from the CA server once per derived key interval. The CA server receives (904) the request and retrieves a content key associated with the asset identifier (and playback position if a playback position was received) from memory. In some embodiments, the content key is also associated with a content key starting position within the piece of content. The CA server can determine the closest content key starting position preceding the playback position and use the content key starting position in retrieving the appropriate content key. If a content key is not already stored in memory, the CA server may request (906) the content key from a key management CA server. The CA server may send a request for a content key where the request includes the asset identifier (ID) and, optionally, the playback position or content key starting position or other key identifier. The key management CA server receives the request and returns (908) the content key associated with the asset identifier (and playback position if applicable) to the CA server. If the key management CA server does not have a content key in memory, it may generate a new content key and store the key in memory. In several embodiments of the invention, the CA server requests a content key from the key management CA server once per content key interval. Alternatively, the CA server may receive a content key at a predetermined time (such as after expiration of a content key interval) without requesting it. One or more CA servers may be given a content key.

The CA server generates (910) at least one derived key using the content key and, optionally, other information such as the inputs described further above in a derivation algorithm. In some embodiments, the CA server may determine a derived key starting position that begins the derived key interval during which the derived key is used to encrypt content. The derived key starting position may be used in the derivation algorithm and/or may be associated with the derived key for later retrieval. The CA server sends (912) the derived key to the playback device. The playback device may also receive portions of encrypted content. The playback device can then use the derived key to decrypt (914) at least a portion of encrypted content.

Additional derived keys may be generated by the CA server and sent to the playback device to decrypt additional portions of content within derived key intervals. Additional derived keys may be generated at a predetermined derived key interval and/or may be generated when requested by the playback device. In many embodiments, the playback device is notified when the content key and/or derived key is changed so that it can generate a new request. In several embodiments, a playback device receives and/or utilizes a content manifest or playlist to facilitate the request and/or playback of a piece of content. A content manifest or playlist may contain information such as, but not limited to, the location of one or more content files, type of content, and format of content. It may also contain markers or indicators at positions within the one or more content files that are content key starting positions or derived key starting positions. When a playback device reaches a key starting position, it may send a request for a new key so that it can continue playback of the content. It may further include other information that can be used to request or identify a proper content key or derived key such as the information discussed further above. Video streaming standards that may utilize content manifests or playlists that can be used in accordance with embodiments of the invention include Dynamic Adaptive Streaming over HTTP (MPEG DASH) promulgated by the Moving Picture Experts Group (MPEG) and HTTP Live Streaming (HLS) promulgated by Apple, Inc. of Cupertino, Calif.

In several embodiments a playback device requests a new derived key from a CA server once per derived key interval. Thus, the actions discussed above can be performed for subsequent requests for second and subsequent derived keys. Although a specific process for generating derived keys and utilizing derived keys in decrypting content are discussed above with respect to FIG. 9, one skilled in the art will recognize that any of a variety of processes and variations of processes can be used for obtaining derived keys and decrypting content using derived keys in accordance with embodiments of the invention. Processes for retrieving content keys and generating derived keys in accordance with embodiments of the invention may be similar such that functionality or actions can be leveraged or interchanged between the processes illustrated in FIGS. 7, 8, and 9.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method for synchronized key derivation and distribution across multiple conditional access servers to provide playback devices with derived keys for decrypting content, the method comprising:
   receiving by a conditional access server a request for a first derived key, where the request includes:
      a first asset identifier that identifies a piece of content; and
      a first playback position within the piece of content associated with the first asset identifier;
   determining using the conditional access server a first content key starting position and a first derived key starting position within the piece of content using the first playback position, where the first content key starting position and first derived key starting position precede the first playback position;
   determining using the conditional access server whether a first content key associated with the first asset identifier and first content key starting position is stored in memory;
   retrieving by the conditional access server the first content key from memory using the first asset identifier and the first content key starting position when the first content key is stored in memory;
   generating by the conditional access server a first derived key using at least the first content key and the first derived key starting position;
   sending by the conditional access server the first derived key in response to the request for a first derived key;
   receiving by the conditional access server a request for a second derived key, where the request includes the first asset identifier and a second playback position within the piece of content associated with the first asset identifiers;
   determining using the conditional access server a second derived key starting position within the piece of content using the second playback position, where the second derived key starting position precedes the second playback position, is a predetermined derived key interval after the first derived key starting position, and is within a predetermined content key interval of the first content key starting position;
   generating by the conditional access server a second derived key using at least the first content key and the second derived key starting position; and
   sending by the conditional access server the second derived key in response to the request for a second derived key.

2. The method of claim 1 further comprising:
   generating by the conditional access server the first content key, storing the first content key in memory, and associating the first content key with the first asset identifier and the first content key starting position when the first content key is not stored in memory.

3. The method of claim 1 further comprising:
   sending by the conditional access server a request for a first content key where the request includes the first asset identifier and first content key starting position, receiving the first content key, storing the first content key in memory, and associating the first content key with the first asset identifier and the first content key starting position when the first content key is not stored in memory.

4. The method of claim 1 further comprising:
   receiving by the conditional access server a request for a third derived key, where the request includes the first asset identifier and a third playback position within the piece of content associated with the first asset identifier;
   determining using the conditional access server a second content key starting position within the piece of content using the third playback position, where the second content key starting position precedes the third playback position and is a predetermined content key interval after the first content key starting position;
   determining using the conditional access server a third derived key starting position within the piece of content using the third playback position, where the third derived key starting position precedes the third playback position, is a predetermined derived key interval after the second derived key starting position, and is within a predetermined content key interval of the second content key starting position;
   determining using the conditional access server whether a second content key associated with the first asset identifier and second content key starting position is stored in memory;
   retrieving by the conditional access server the second content key from memory using the first asset identifier and the second content key starting position when the second content key is stored in memory;
   generating by the conditional access server a third derived key using at least the second content key and the third derived key starting position; and
   sending by the conditional access server the third derived key in response to the request for a third derived key.

5. The method of claim 4 further comprising:
   sending by the conditional access server a request for a second content key where the request includes the first asset identifier and second content key starting position, receiving the second content key, storing the second content key in memory, and associating the second content key with the first asset identifier and the second content key starting position when the second content key is not stored in memory.

6. The method of claim 1, wherein the first content key starting position designates the starting location of a portion of the content that is encrypted using at least one derived key generated using the first content key and the first derived key starting position designates the starting location of a portion of the content that is encrypted using the first derived key.

7. The method of claim 1 wherein generating by the conditional access server a first derived key using at least the first content key and the first playback position comprises generating a first derived key using at least the first content key, the first playback position, and a license key issued to a plurality of conditional access servers.

8. The method of claim 1 wherein:
the request for a first derived key further includes the type of the content; and
generating by the conditional access server a first derived key using at least the first content key and the first playback position further comprises generating a first derived key using at least the first content key, the first playback position, and the type of the content.

9. The method of claim 1 wherein generating by the conditional access server a first derived key using at least the first content key and the first playback position further comprises generating a first derived key using at least the first content key, the first playback position, and the derived key expiration time.

10. The method of claim 1 wherein generating by the conditional access server a first derived key using at least the first content key and the first playback position further comprises generating a first derived key using at least the first content key, the first playback position, and the asset identifier.

11. The method of claim 1 further comprising receiving by the conditional access server a derivation algorithm identifier that identifies the algorithm to be used in generating the first derived key.

12. A conditional access server system for synchronized key derivation and distribution to provide playback devices with derived keys for decrypting content, the server system comprising:
a processor; and
a memory storing a key derivation application;
wherein the key derivation application directs the processor to:
receive a request for a first derived key, where the request includes:
a first asset identifier that identifies a piece of content; and
a first playback position within the piece of content associated with the first asset identifier;
determine a first content key starting position and a first derived key starting position within the piece of content using the first playback position, where the first content key starting position and first derived key starting position precede the first playback position;
determine whether a first content key associated with the first asset identifier and first content key starting position is stored in memory;
retrieve the first content key from memory using the first asset identifier and the first content key starting position when the first content key is stored in memory;
generate a first derived key using at least the first content key and the first derived key starting position;
send the first derived key in response to the request for a first derived key;
receive a request for a second derived key, where the request includes the first asset identifier and a second playback position within the piece of content associated with the first asset identifier;
determine a second derived key starting position within the piece of content using the second playback position, where the second derived key starting position precedes the second playback position, is a predetermined derived key interval after the first derived key starting position, and is within a predetermined content key interval of the first content key starting position;
generate a second derived key using at least the first content key and the second derived key starting position; and
send the second derived key in response to the request for a second derived key.

13. The system of claim 12 wherein the key derivation application further directs the processor to generate the first content key, store the first content key in memory, and associate the first content key with the first asset identifier and the first content key starting position when the first content key is not stored in memory.

14. The system of claim 12 wherein the key derivation application further directs the processor to send a request for a first content key where the request includes the first asset identifier and first content key starting position, receive the first content key, store the first content key in memory, and associate the first content key with the first asset identifier and the first content key starting position when the first content key is not stored in memory.

15. The system of claim 12 wherein the key derivation application further directs the processor to:
receive a request for a third derived key, where the request includes the first asset identifier and a third playback position within the piece of content associated with the first asset identifier;
determine a second content key starting position within the piece of content using the third playback position, where the second content key starting position precedes the third playback position and is a predetermined content key interval after the first content key starting position;
determine a third derived key starting position within the piece of content using the third playback position, where the third derived key starting position precedes the third playback position, is a predetermined derived key interval after the second derived key starting position, and is within a predetermined content key interval of the second content key starting position;
determine whether a second content key associated with the first asset identifier and second content key starting position is stored in memory;
retrieve the second content key from memory using the first asset identifier and the second content key starting position when the second content key is stored in memory;
generate a third derived key using at least the second content key and the third derived key starting position; and
send the third derived key in response to the request for a third derived key.

16. The system of claim 15 wherein the key derivation application further directs the processor to:
send a request for a second content key where the request includes the first asset identifier and second content key starting position, receive the second content key, store the second content key in memory, and associate the second content key with the first asset identifier and the second content key starting position when the second content key is not stored in memory.

17. The system of claim 12, wherein the first content key starting position designates the starting location of a portion of the content that is encrypted using at least one derived key generated using the first content key and the first derived key starting position designates the starting location of a portion of the content that is encrypted using the first derived key.

18. The system of claim 12 wherein the key derivation application directing the processor to generate a first derived key using at least the first content key and the first position playback position further comprises the key derivation application directing the processor to generate a first derived key using at least the first content key, the first playback position, and a license key issued to a plurality of conditional access servers.

19. The system of claim 12 wherein:
the request for a first derived key further includes the type of the content; and
the key derivation application directing the processor to generate a first derived key using at least the first content key and the first playback position further comprises the key derivation application directing the processor to generate a first derived key using at least the first content key, the first playback position, and the type of the content.

20. The system of claim 12 wherein the key derivation application directing the processor to generate a first derived key using at least the first content key and the first playback position further comprises the key derivation application directing the processor to generate a first derived key using at least the first content key, the first playback position, and the derived key expiration time.

21. The system of claim 12 wherein the key derivation application directing the processor to generate a first derived key using at least the first content key and the first playback position further comprises the key derivation application directing the processor to generate a first derived key using at least the first content key, the first playback position, and the asset identifier.

22. The system of claim 12 wherein the key derivation application further directs the processor to receive a derivation algorithm identifier that identifies the algorithm to be used in generating the first derived key.

* * * * *